United States Patent [19]

Koizumi

[11] Patent Number: 5,007,600

[45] Date of Patent: Apr. 16, 1991

[54] TWO STAGE REEL MECHANISM FOR TAPE RECORDER

[75] Inventor: Satoru Koizumi, Higashihiroshima, Japan

[73] Assignee: Sharp Kabushiki Kaisha, Osaka, Japan

[21] Appl. No.: 469,678

[22] Filed: Jan. 25, 1990

Related U.S. Application Data

[60] Continuation of Ser. No. 264,082, Oct. 28, 1988, abandoned, which is a division of Ser. No. 933,391, Nov. 21, 1986, Pat. No. 4,815,675.

[30] Foreign Application Priority Data

Nov. 29, 1985 [JP] Japan ............................. 60-184729
Nov. 29, 1985 [JP] Japan ............................. 60-184730

[51] Int. Cl.$^5$ ............................................. G11B 15/32
[52] U.S. Cl. ............................. 242/194; 242/193; 242/68.3
[58] Field of Search ................ 242/193, 194, 68.3, 242/180

[56] References Cited

U.S. PATENT DOCUMENTS

| | | |
|---|---|---|
| 3,652,030 | 3/1972 | Nakano . |
| 3,665,114 | 5/1972 | Hathaway . |
| 3,756,521 | 9/1973 | Werner . |
| 3,894,701 | 7/1975 | Moscaret . |
| 3,955,778 | 5/1976 | Lu . |
| 4,083,516 | 4/1978 | Schuch . |
| 4,121,786 | 10/1978 | Hathaway ............................. 242/193 |
| 4,206,487 | 6/1980 | Sato . |

FOREIGN PATENT DOCUMENTS

| | | |
|---|---|---|
| 2211050 | 1/1976 | Fed. Rep. of Germany . |
| 679720 | 9/1952 | United Kingdom . |
| 1342517 | 1/1974 | United Kingdom . |
| 1365957 | 9/1974 | United Kingdom . |
| 1425980 | 2/1976 | United Kingdom . |
| 2089092 | 6/1982 | United Kingdom . |
| 2173940 | 10/1986 | United Kingdom . |

*Primary Examiner*—Stuart S. Levy
*Assistant Examiner*—Steven M. duBois
*Attorney, Agent, or Firm*—Birch, Stewart, Kolasch & Birch

[57] ABSTRACT

A tape recorder in which first and second cassette tapes are loaded on a two stage reel mechanism, the two stage reel mechanism comprising a first reel, operatively connected to reel driving circuit, for transmitting a rotating force of the driving circuit to the first cassette tape, the first reel including a plurality of first engaging members at its periphery engaging with projections of a reel hub of the first cassette tape, and a second reel, operatively connected to the driving means and coaxially provided with the first reel for transmitting a rotating force of the driving circuit to the second cassette tape, the second reel including a plurality of second engaging members at its periphery engaging with projections of a reel hub of the second cassette tape, wherein at least one of the ends respective reels is tapered.

5 Claims, 4 Drawing Sheets

TWO STAGE REEL MECHANISM FOR TAPE RECORDER

This application is a continuation, of application Ser. No. 07/264,082 filed on Oct. 28, 1988, now abandoned, which is a divisional of application Ser. No. 06/933,391, filed Nov. 21, 1986 now U.S. Pat. No. 4,815,675.

BACKGROUND OF THE INVENTION

The present invention relates to a multiple stage reel mechanism for a tape recorder in which a plurality of cassette tapes, preferably, two cassette tapes, can be loaded in a pile or one can be stacked on top of the other.

A tape recorder in which two cassette tapes can be coaxially loaded in a pile or stacked one on top of the other and driven individually or simultaneously by a capstan, a tape feeding reel and a tape winding reel has been developed. The tape feeding reel has a first feeding reel for a first cassette tape and a second feeding reel for a second cassette tape. The first and second feeding reels are coaxially provided so that the first feeding reel is near the bearing portion of the tape feeding reel and the second feeding reel is separated from the bearing portion of the tape feeding reel. The tape winding reel has a first winding reel for the first cassette tape and a second winding reel for the second cassette tape. The first and second winding reels are coaxially provided so that the first winding reel is near the bearing portion of the tape winding reel and the second winding reel is separated from the bearing portion of the tape winding reel.

In the above tape recorder, after the tape cassettes are stored in a cassette holder, the holder is moved from the cassette inserting position to the cassette tape storing position to load the cassette tapes in a pile, and then the tape cassettes are loaded on the capstan, the tape feeding reel and the tape winding reel. To remove the tape cassettes from the tape recorder, the cassette holder is moved from the tape storing position to the tape inserting position.

In the case where the reel axis of the second feeding reel deviates from that of the first feeding reel or the reel axis of the second winding reel deviates from that of the first winding reel by manufacturing error or attachment error, when the holder carrying a plurality of tape cassettes is moved from the cassette tape storing position to the cassette inserting position to remove the cassette tape from the holder, the first tape cassette may strike the second tape feeding reel or the second winding reel, so that the tape cassette may not be easily or smoothly removed from the holder. On the contrary, when the holder carrying a plurality of tape cassettes is moved from the cassette tape inserting position to the cassette tape storing position to load the tape cassettes in a pile, the first cassette tape may strike the first feeding reel or the first winding reel, so that the tape cassettes are not easily or smoothly loaded on the capstain, the feeding reel and the winding reel.

SUMMARY OF THE INVENTION

Accordingly, it is an object of the present invention to provide a two stage reel mechanism of a tape recorder which can easily and smoothly load or unload tape cassettes in a pile.

It is another object of the present invention to provide a two stage reel mechanism for a tape recorder which can easily and smoothly load a plurality of tape cassettes on a two stage reel mechanism in a pile and can easily and smoothly remove the plurality of tape cassettes from the two stage reel mechanism.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, in a tape recorder in which first and second cassette tapes are loaded on a two stage reel mechanism in a pile, the two stage reel mechanism comprises a first reel, operatively connected to reel driving means, for transmitting a rotating force from a reel driving means to the first cassette tape, the first reel generally including a tapered portion at the end thereof and a plurality of first engaging members at its periphery engaging with projections of a reel hub of the first cassette tape, and a second reel, operatively connected to the reel driving means and coaxially provided with the first reel, for transmitting a rotating force from the driving means to the second cassette tape, the second reel including a tappered portion at least at one end of the second reel and a plurality of second engaging members at its periphery engaging with projections of a reel hub of the second cassette tape.

The diameter of the first reel is equal to or greater than that of the second reel. The height from the axis of the center of the first reel to the top of the first engaging members is equal to the center of the height from the axis of the second reel to the top of the second engaging members.

According to another embodiment of the present invention, in a tape recorder in which first and second cassette tapes are loaded in a pile or stack on a two stage reel mechanism, the two stage reel mechanism comprises a first reel, operatively connected to a reel driving means, for transmitting a rotating force from the driving means to the first cassette tape, the first reel including a plurality from first engaging members at its periphery engaging with projections of a reel hub of the first cassette tape, and a second reel, operatively connected to the driving means and coaxially provided with the first reel, for transmitting a rotating force from the driving means to the second cassette tape, the second reel including tapered portions at both ends of the second reel and a plurality of second engaging members at its periphery engaging with projections of a reel hub of the second cassette tape.

The diameter of the second reel is greater than that of the first reel. The height from the axis of the first reel to the top of the first engaging members is equal to the height from the axis of the second reel to the top of the second engaging members.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
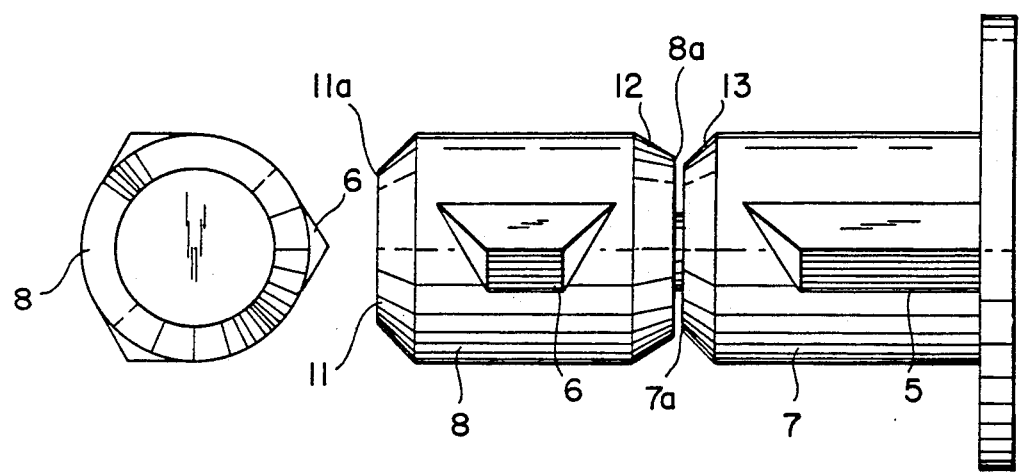
FIG. 1 shows a side view of a two stage reel mechanism according to a first embodiment of the present invention.

A first embodiment of the present invention will be described below with reference to FIGS. 1 and 2. In a tape recorder used in the present invention, two cassette tapes 1 and 2 are coaxially loaded or stacked in a pile on a capstan (not shown) and a two stage reel mechanism. The two stage reel mechanism may be used for the cassette tape winding reel and/or the cassette tape feeding reel. For example, the tape winding reel includes a first winding reel for a first cassette tape and a second winding reel for a second cassette tape. The first winding reel and the second winding reel are coaxially provided so that the first winding reel is near to the bearing portion b of the tape winding reel and the second winding reel is separated by the first winding reel from the bearing portion b of the tape winding reel. The cassette tape feeding reel has a first feeding reel for the first cassette tape and a second feeding reel for the second cassette tape. The first and the second feeding reels are coaxially provided so that the first feeding reel is near to the bearing portion of the tape feeding reel and the second feeding reel is separated from the bearing portion of the tape feeding reel. The first and second cassette tapes 1 and 2 may be individually or simultaneously driven. Also, the first and second cassette tapes 1 and 2 may be sequentially driven from the first cassette tape to the second cassette tape 2 or from the second cassette tape 2 to the first cassette tape 1.

Although the two stage reel mechanism of the present invention may be used for a tape winding reel and/or a tape feeding reel, a tape winding reel will be described as an embodiment of the present invention. As shown in FIGS. 1 and 2, a tape winding reel comprises a first winding reel 7 provided near to or adjacent the reel bearing b of the tape winding reel and a second winding reel 8 separated from the reel bearing of the tape winding reel by the first winding reel. The first and the second winding reels 7 and 8 are coaxially provided. The first winding reel 7 is provided with a plurality of engaging members 5, preferably three engaging members, on its periphery engaging with projections 9 of a reel hub 3 of the first cassette tape 1 and a tapered portion 13 at the end 7a of the first winding reel 7. The second winding reel 8 is provided with a plurality of engaging members 6, preferably three engaging members, on its peripery engaging with projections 10 of a reel hub 4 of the second cassette tape 2 and tapered portions 11 and 12 at both ends 11a and 8a of the second winding reel 8. The diameter of the first winding reel 7 is equal to that of the second winding reel 8. The height from the center of the rotating axis of the first winding reel 7 to the top of the engaging members 5 is equal to the height from the center of the rotating axis of the second winding reel 8 to the top of the engaging members 6.

The rotating axes of the first and second winding reels 7 and 8 are selectively connected to a driving mechanism to drive the first tape cassette 1 and the second tape cassette 2, respectively. Tapered portions are designated by numerals 11, 12 and 13.

Figure 2:
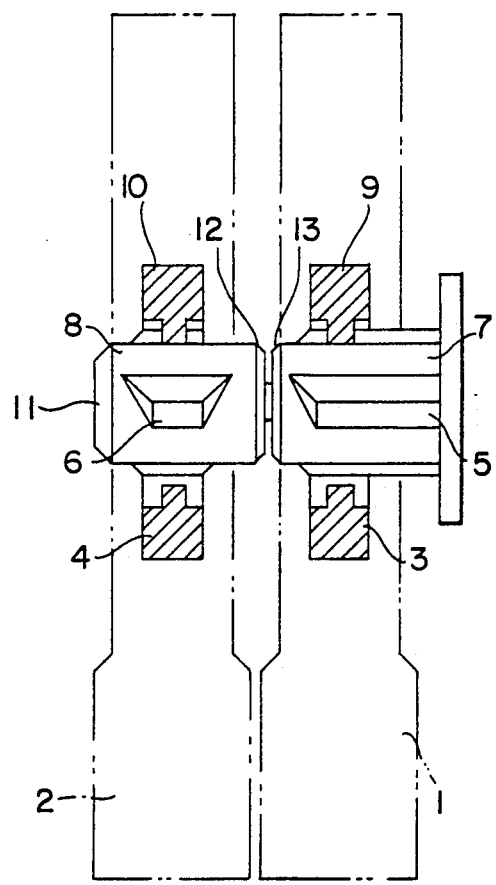
FIG. 2 shows a plan view of the two stage reel mechanism according to the embodiment of the present invention when the tape cassettes are loaded on the two stage reel mechanism.

In the first embodiment of the present invention, as shown in FIG. 1, even when the axis of the first winding reel 7 deviates from the axis of the second winding reel 8 by attachment error or manufacturing error, the cassette tapes 1 and 2 can be smoothly and easily loaded on the two stage reel mechanism, such as the tape winding reel, and smoothly and easily removed from the two stage reel mechanism such as the tape winding reel, because the tape cassettes 1 and 2 are introduced by way of the tapered portions 11 and 13.

Figure 3:
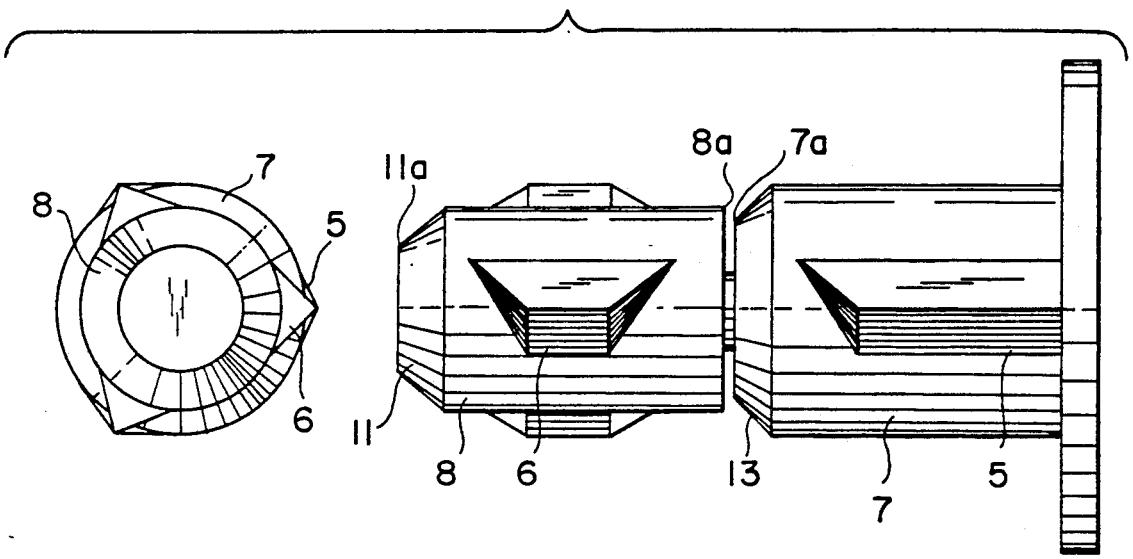
FIG. 3 shows a side view of a two stage reel mechanism according to a second embodiment of the present invention.

FIG. 3 shows a side view of a two stage reel mechanism of a second embodiment of the present invention. In FIG. 3, like elements are designated with the same references as in FIG. 1.

The end 7a of the first winding reel 7 and the end 11a of the second winding reel 8 are tapered, but the end 8a of the second winding reel 8 is not tapered. The diameter of the first winding reel 7 is greater than that of the second winding reel 8. The height from the axis of the first winding reel 7 to the top of the engaging members 5 is equal to the height from the axis of the second winding reel 8 to the top of the engaging members 6. In the second embodiment of the present invention, even when the the axis of the first winding reel 7 deviates from the axis of the second winding reel 8 by attachment error or manufacturing error, the cassette tapes 1 and 2 can be smoothly and easily loaded on the two stage reel mechanism and smoothly and easily removed from the two stage reel mechanism because the diameter of the second winding reel 8 is less than the diameter of the first winding reel 7 and the end 7a of the first winding reel 7 is tapered.

Figure 4:
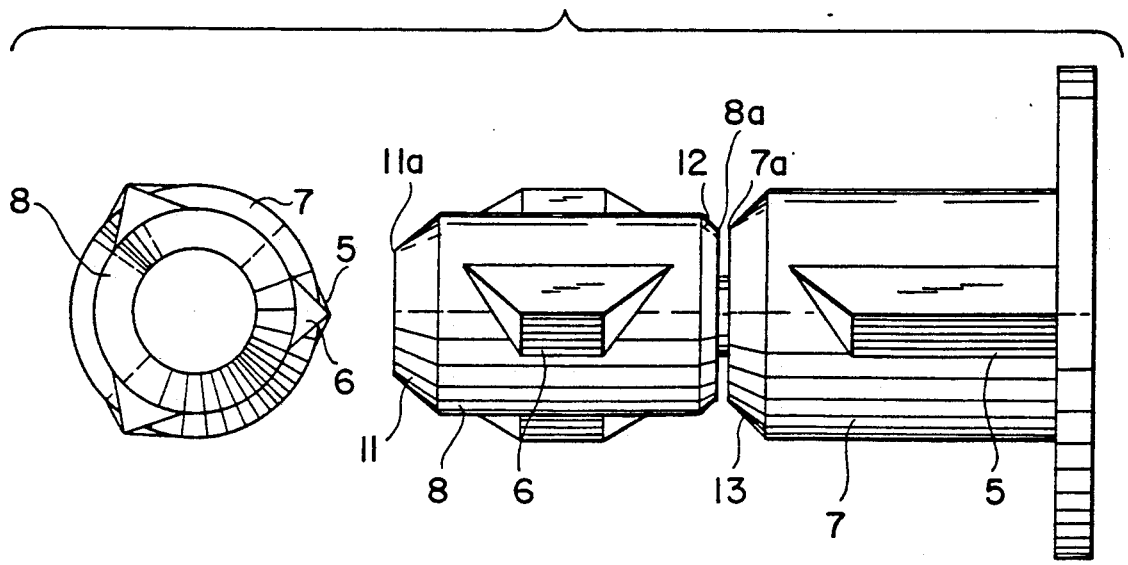
FIG. 4 shows a side view of a two stage reel mechanism accoding to a third embodiment of the present invention.

FIG. 4 shows a side view of a two stage reel mechanism of a third embodiment of the present invention. In FIG. 4, like elements are designated with the same references as in FIG. 1.

The end 7a of the first winding reel 7 and the both ends 8a and 11a of the second winding reel 8 are tapered. The diameter of the first winding reel 7 is greater than that of the second winding reel 8. The height from the axis of the second winding reel 8 to the top of the engaging members 6 is equal to the height from the axis of the first winding reel 7 to the top of the engaging members 5. In the third embodiment of the present invention, even when the axis of the first winding reel 7 deviates from the axis of the second winding reel 8 by attachment error or manufacturing error, the tape cassettes 1 and 2 can be easily and smoothly loaded on the two stage reel mechanism and smoothly and easily removed from the two stage reel mechanism.

Figure 5:
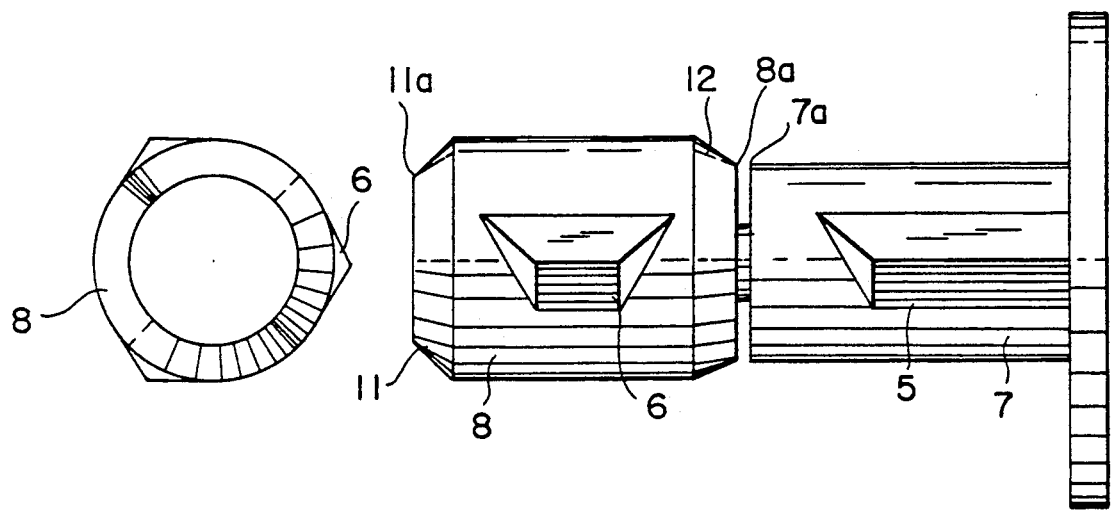
FIG. 5 shows a side view of a two stage reel mechanism according to fourth embodiment of the present invention.

FIG. 5 shows a side view of a two stage reel mechanism according to a fourth embodiment of the present invention. In FIG. 4, like elements are designated with the same references as in FIG. 1.

The both ends 8a and 11a of the second winding reel 8 are tapered, but the end 7a of the first winding reel 7 is not tapered. The diameter of the second winding reel 8 is greater than that of the first winding reel 7. The height from the axis of the second winding reel 8 to the top of the engaging members 8 is equal to the height from the axis of the first winding reel 7 to the top of the engaging members 5. In the fourth embodiment of the present invention, even when the axis of the first winding reel 7 deviates from the axis of the second winding reel by attachment error or manufacturing error, the first and second tape cassettes can be easily and smoothly loaded on the two stage reel mechanism and smoothly or easily removed from the two stage reel mechanism because the diameter of the second winding reel 8 is greater than that of the first winding reel 7 and the end 8a of the second winding reel 8 is tapered.

Figure 6:
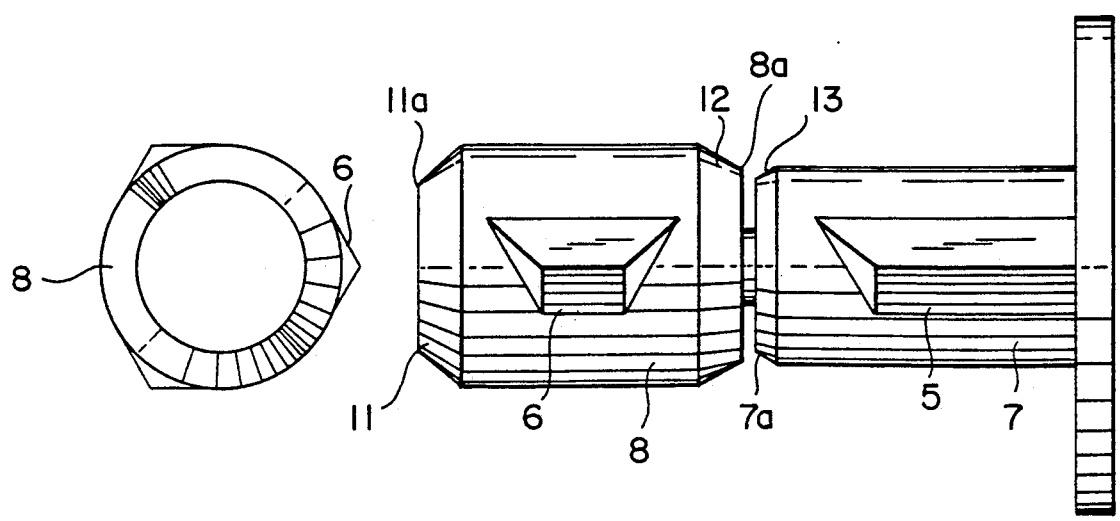
FIG. 6 shows a side view of a two stage reel mechanism according to a fifth embodiment of the present invention.

FIG. 6 shows a side view of a second two stage reel mechanism according to a fifth embodiment of the present invention. In FIG. 6, like elements are designated with the same references as in FIG. 1.

The both ends 8a and 11a of the second winding reel 8 and the end 7a of the first winding reel 7 are tapered. The diameter of the second winding reel 8 is greater than that of the first winding reel 7. The height from the axis of the second winding reel 8 to the top of the engaging members 6 is equal to the height from the axis of the first winding reel 7 to the top of the engaging members 5. In the fifth embodiment of the present invention, even when the axis of the first winding reel 7 deviates from the second winding reel 8 by attachment error or manufacturing error, the tape cassettes 1 and 2 are easily and smoothly loaded on the two stage reel mechanism and smoothly and easily removed from the two stage reel mechanism because the diameter of the second winding reel 8 is greater than that of the first winding reel 7 and the end 7a of the first winding reel 7 and the ends 8a and 11a of the second winding reel 8 are tapered.

Figure 7:
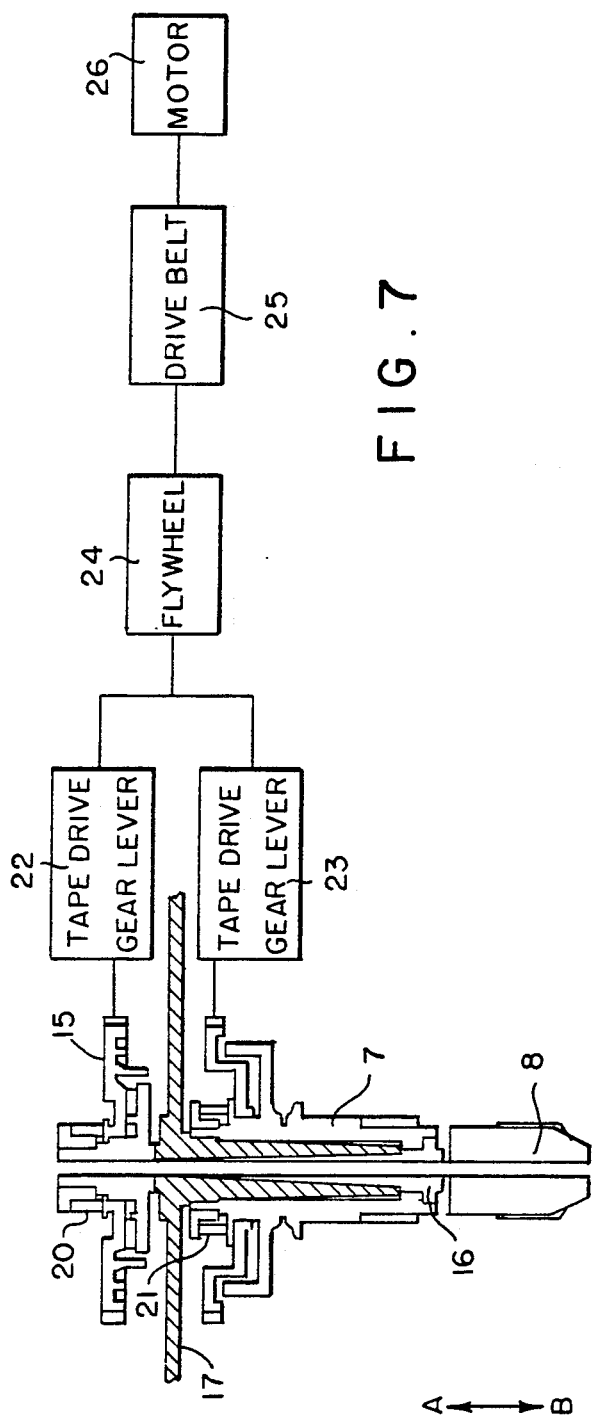
FIG. 7 shows a sectional view of the tape winding reel of the two stage reel mechanism of the present invention.
Figure 8:
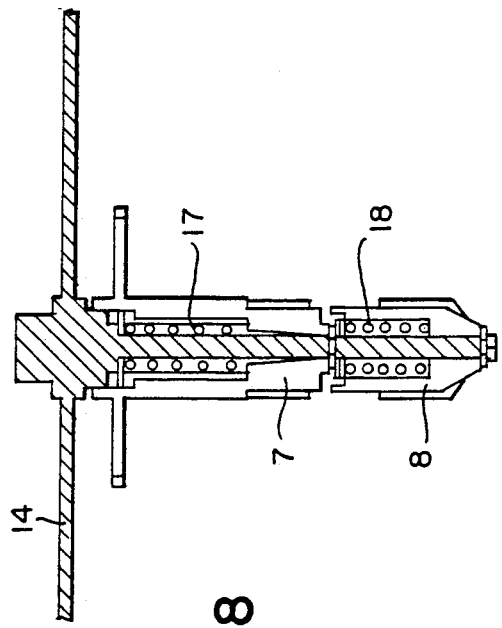
FIG. 8 shows a sectional view of the tape feeding reel of the two stage reel mechanism of the present invention.

FIGS. 7 and 8 show sectional views of a two stage tape winding reel and a two stage tape feeding reel of the two stage reel mechanism of the present invention, respectively.

The operation of the two stage reel mechanism of the present invention will be described with reference to FIGS. 7 and 8. The first winding reel 7 is operatively engaged with a slipping roller 19 of a slipping mechanism to drive the the first winding reel 7. The slipping roller 19 of the slipping mechanism is connected to a driving motor 26 through a tape drive gear lever 23, a flywheel 24, and a a drive belt 25. In the case where the first winding reel 7 is driven, the first winding reel 7 is engaged with the slipping roller 19 and the rotating force of the driving motor 26 is fed to the slipping roller 19 via the drive belt 25, the flywheel 24, and the tape drive gear lever 23. Therefore, the first winding reel 7 is rotated to drive the first cassette tape 1. The rotating force of the motor 26 is transmitted from the first winding reel 7 to the first cassette tape 1.

The second winding reel 8 is operatively engaged with a slipping roller 15 of the slipping mechanism to drive the second winding reel 8. The slipping roller 15 of the slipping mechanism is connected to the driving motor 26 through a tape drive gear lever 22, the flywheel 24, and the drive belt 25. In the case where the second winding reel 8 is driven, the slipping roller 15 of the slipping mechanism is engaged with the second winding reel 8 and the rotating force of the motor 26 is fed to the slipping roller 15 via the drive belt 25, the flywheel 24, and the tape drive gear lever 22. Therefore, the second winding reel 8 is rotated to drive the second cassette tape 2. The rotating force of the motor 26 is transmitted from the second winding reel 8 to the second cassette tape 2.

The slipping rollers 15 and 19 are forced in the directions A and B by tension springs 21 and 20 respectively, and operatively engage with the first and the second reel 8 and 7 against the tension springs 20 and 21, respectively. The first tape winding reel 7 is rotatably supported on the main body 14 of the tape recorder by a retainer 16.

When the first cassette tape 1 is driven, the flywheel 24 selects the tape drive gear lever 23 and the slipping roller 19 so that the slipping roller 19 is engaged with the first winding reel 7. Therefore, the first tape winding reel 7 is rotated and the first cassette tape 1 is driven.

When the first cassette tape 1 and the second cassette tape 2 are simultaneously driven, the flywheel 24 selects the tape drive gear levers 22 and 23 so that the slipping rollers 19 and 15 are engaged with the first winding reel 7 and the second winding reel 8, respectively. Therefore, the first and the second winding reels 7 and 8 are simultaneously rotated and the first and second cassette tapes 1 and 2 are simultaneously driven.

When the first cassette tape 1 is driven subsequent to the operation of the second cassette tape 2, the flywheel 24 selects the tape drive gear lever 22 and the slipping roller 15 so that the second winding reel 8 is engaged with the slipping roller 15. Therefore, the second winding reel 8 is rotated to drive the second cassette tape 2. After the operation of the second tape winding reel 8 is completed, the flywheel 24 selects the tape drive gear lever 23 and the slipping roller 19 so that the first winding reel 7 is engaged with the slipping roller 19. Therefore, the first winding reel 7 is rotated by the rotating force of the motor 26 to drive the first cassette tape 1.

In FIG. 8, tension springs are designated by numeral 17 and 18. The first feeding reel 7 and the secod feeding reel 8 are individually or simultaneously rotated.

As described above, in a tape recorder in which two cassette tapes are loaded on a two stage reel mechanism piled or stacked one on top of the other, the two stage reel mechanism comprises a first reel and a second reel. The first and the second reels are coaxially provided. At least one of the ends of the first reels and the second reel faced away from the bearing surface b is tapered. If the diameter of one reel is different from that of the other reel, the end of the reel having a diameter greater than that of the other reel is tapered. Accordingly, even when the axis of the first winding reel deviates from the axis of the second reel by attachment error or manufacturing error, the cassette tapes can be smoothly and easily loaded on the two stage reel mechanism and smoothly and easily removed from the two stage reel mechanism.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A two stage reel mechanism of a tape recorder on which first and second compact type cassette tapes supported in a stacked arrangement by a cassette holder of said recorder can be interchangeably loaded, said first cassette tape and said second cassette tape being identical in shape and size with each other, said first cassette tape being provided with a first hub which has a plurality of first projections at an inner circumference thereof, said second cassette tape being provided with a second hub which has a plurality of second projections at an inner circumference thereof, said holder being movable toward and away from a main body of said recorder between a closed position, wherein said first and second cassette tapes can be recorded and played, and an open position, wherein said first and second cassette tapes can be inserted in and removed from said holder, said two stage reel mechanism comprising:

a first reel operatively connected to a reel driving means for transmitting a rotating force from the reel driving means to said first cassette tape, said first reel being provided with a plurality of first engaging members made of rigid material at its periphery for engaging in a rotating direction of said first reel with said first projections when said holder is in said closed position, said first reel being juxtapositioned to a bearing portion of a tape winding or tape feeding reel; and a second reel, operatively connected to the reel driving means and coaxially provided with said first reel for transmitting a rotating force of the driving means to said second cassette tape, said second reel being provided with a plurality of second engaging members made of rigid material at its periphery for engaging in a rotating direction of said second reel with said second projections when said holder is in said closed position, wherein the diameters of said first and second reels are equal, the height measured from the center of the axis of rotation of said first and second reels to the top or outermost dimension of said respective first and second engaging members is equal, at least the leading end of said second reel has a tapered portion, and said second engaging member is shaped as a prism extending along an axial direction of said second reel, including two side surfaces for abutting said second projections so as to transmit said rotating force, and having a first base portion at a leading end thereof and a second base portion at the other end thereof, said first base portion comprising a pyramid whose vertex is pointed out toward said leading end of said second reel and is situated on said second reel, said second base portion comprising a pyramid whose vertex is pointed out toward the other end of said second reel and is situated on said second reel.

2. The two stage reel mechanism of claim 1, wherein a leading end of said first reel is tapered.

3. The two stage reel mechanism of claim 1, wherein a leading end of said first reel is tapered and both ends of said second reel are tapered.

4. The two stage reel mechanism of claim 1, wherein said first reel includes a hollow portion defined therein and said second reel includes an axial extension which is inserted through said hollow portion of said first reel.

5. The two stage reel mechanism of claim 1, wherein said first engaging member is shaped as a prism extending along an axial direction of said first reel, including two side surfaces for abutting said first projections so as to transmit said rotating force, and having at a leading end thereof a base portion comprising a pyramid whose vertex is pointed out toward a leading end of said first reel and is situated on said first reel.

* * * * *